Oct. 3, 1967 D. ERRICHIELLO ET AL 3,345,568
TRANSISTORIZED PORTABLE RADIO TRANSMITTER-RECEIVER STRUCTURE
Filed Jan. 13, 1964
3 Sheets-Sheet 1

INVENTORS.
Dominic Errichiello
Philip J. Hansen
Norman P. Alexander
By: Mueller & Aichele Attys.

INVENTORS.
Dominic Errichiello
Philip J. Hansen
Norman P. Alexander
By: Mueller & Aichele Attys.

TRANSISTORIZED PORTABLE RADIO TRANSMITTER-RECEIVER STRUCTURE

Filed Jan. 13, 1964

3 Sheets-Sheet 3

INVENTORS.
Dominic Errichiello
Philip J. Hansen
Norman P. Alexander
By: Mueller & Aichele Attys 3,345,568

TRANSISTORIZED PORTABLE RADIO TRANSMITTER-RECEIVER STRUCTURE

Dominic Errichiello, Melrose Park, Philip J. Hansen, Chicago, and Norman P. Alexander, Elmhurst, Ill., assignors to Motorola, Inc., Chicago, Ill., a corporation of Illinois Filed Jan. 13, 1964, Ser. No. 337,347
10 Claims. (Cl. 325—16)

This invention relates in general to portable electronic apparatus and in particular to a transistorized miniature radio transmitter and receiver device.

Miniaturized electronic apparatus has come into prominent usage in recent years, particularly transistorized radio devices of the type for carrying on the person and operated from a self-contained battery power source. The use of transistors makes it possible to provide a compact light weight transmitter powered by batteries because of the small size and reduced operating power requirements of the transistor.

A miniaturized hand held transmitter and receiver differs from larger units in many respects. A microphone and speaker must be provided which are easily accessible to the operator of the hand held device. The large number of components used in a device of this nature must be securely mounted and properly connected for electrical efficiency. Interference between the components must be kept to a minimum. The components inside the transmitter-receiver housing must be protected from the elements, and the controls and external portions must be protected from accidental damage. The transmitter and receiver should be easily carried in the hand and operated in this position with a minimum of physical effort by the operator. Provision should be made for the use of either rechargeable or single use disposable batteries. Heat sinks must be provided to remove the heat generated by the power transistors.

Accordingly, it is an object of this invention to provide a miniature hand held transistorized receiver and transmitter with means for supporting and positioning a large number of components with a minimum of interaction between them.

A further object of this invention is to provide a miniature hand held transistorized receiver and transmitter with means for preventing moisture from entering the housing containing the device.

Another object of this invention is to provide a miniature hand held transistorized transmitter and receiver which can be easily held by the operator.

Still another object of this invention is to provide a miniature hand held transistorized transmitter and receiver with means whereby both rechargeable or single use batteries can be used without danger of connecting the single use battery to a charging circuit.

A still further object of this invention is to provide a miniature hand held transistorized transmitter and receiver with a heat sink for dissipating the heat generated therein.

A feature of this invention is the provision of a miniature hand held transistorized transmitter and receiver wherein the transmitter and receiver components are mounted on separate printed wiring boards to provide isolation between the transmitter and receiver portions. The printed wiring boards are secured in the housing by mounting them between the cover and ledges on the sidewall of the case.

Another feature of this invention is the provision of a miniature hand held transistorized transmitter and receiver with components having mounting studs thereon to provide means for mounting other components.

A further feature of this invention is the provision of a miniature hand held transmitter and receiver device having a housing with serrated sides and a lip below the push-to-talk switch for ease in grasping the housing when operating the device.

Another feature of this invention is the provision of a miniature hand held transistorized transmitter and receiver with a battery compartment having terminals therein so arranged that single use batteries are not connected to charging terminals. The battery compartment and batteries have particular shapes so that the batteries cannot be installed with reversed polarity.

Still another feature of this invention is the provision of a miniature hand held transistorized transmitter and receiver with breather holes from the circuit compartment to the battery compartment whereby the circuit portion of the device is vented without exposure to outside weather.

Another feature of this invention is the provision of a miniature hand held transistorized transmitter and receiver with jacks having boots covering the inside portion thereof to prevent moisture from entering the device.

A still further feature of this invention is the provision of a miniature hand held transistorized transmitter and receiver with a metal cover plate mechanically connected to the power output transistors so that heat from these transistors is conducted to the cover plate for dissipation thereby.

The invention is illustrated in the drawings wherein.

In practicing this invention a miniaturized battery powered radio transmitting and receiving device is provided, which includes a plastic housing containing the electric circuit components mounted on printed wiring boards. Separate transmitting and receiving printed wiring boards are used to prevent interaction between the transmitting and receiving circuits. Certain components are provided with mounting studs to secure auxiliary printed wiring boards. The transmitter and receiver printed wiring boards are secured in the plastic case by being held between the cover and ledges along the sides of the case. Jacks for external connections are recessed in the case for their protection and have rubber boot seals around the rearward portion to prevent the entrance of water. A telescopic antenna of a predetermined minimum length is mounted through the end wall which also provides a mounting surface for the control knobs. The antenna cooperates with one corner of the housing to prevent damage to the control knobs.

The plastic housing contains serrations on the sides together with a lip below the push-to-talk switch which provides for ease in handling by the operator. The speaker and microphone are concentrically mounted so that the operator can receive and transmit through one opening in the case. The battery compartment contains three terminals, enabling the use of both chargeable and single use disposable batteries without danger of the single use disposable battery being connected to a charging voltage. Finger stock connected to the output transistors is positioned against the metallic rear cover for conducting heat from the transistors to the rear cover to provide a large external heat sink for the transmitter.

Figures 1, 3:
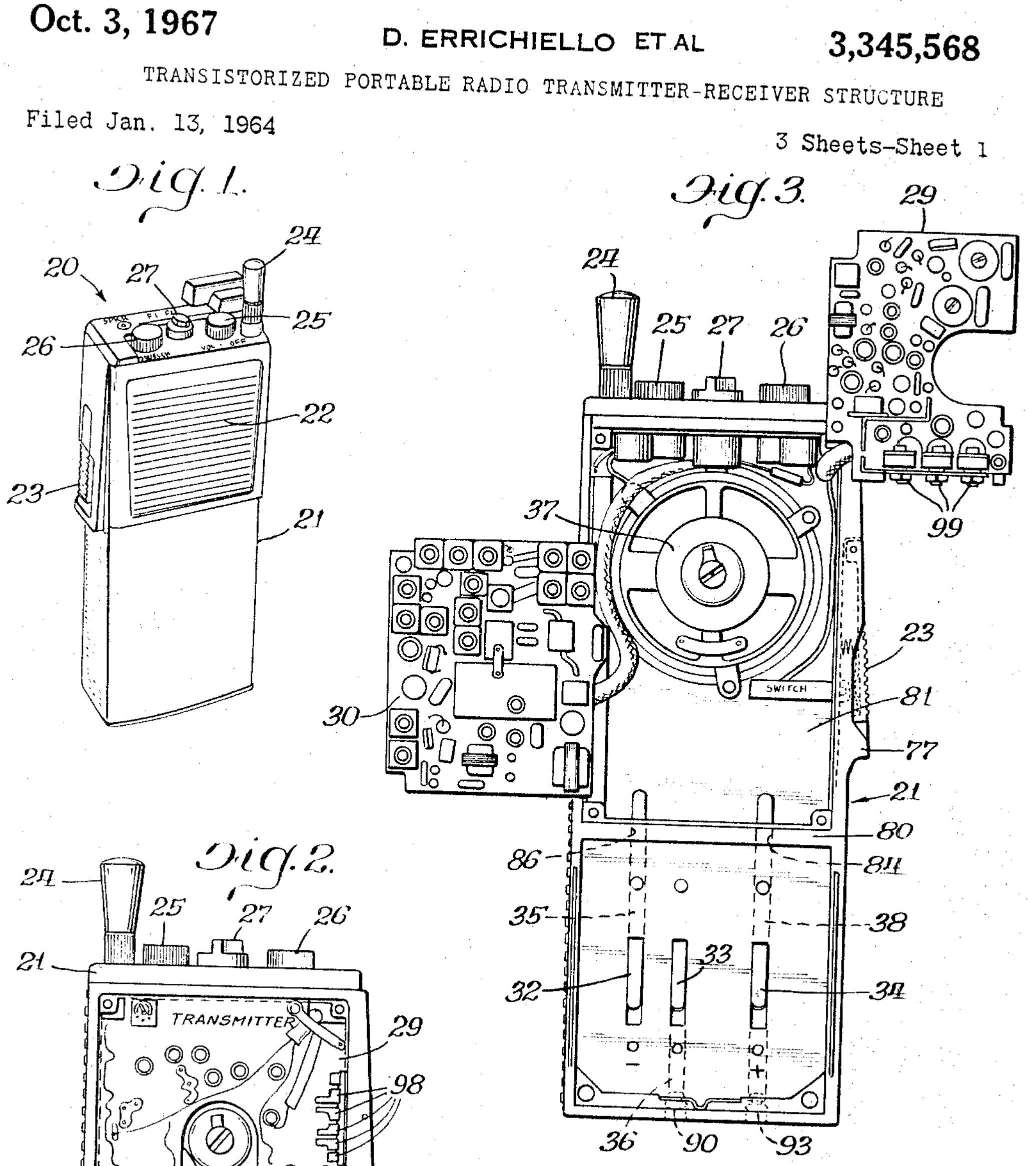
FIG. 1 is a perspective view of a miniature hand held transmitter and receiver.
FIG. 3 is a view of the transmitter and receiver housing shown in FIG. 2 with the printed wiring removed.

Referring to the drawings, FIG. 1 is a perspective view of a miniature hand held transistorized transmitter and receiver 20 contained in a plastic housing 21. Located on one end of the housing 21 are the volume and on-off control 25, squelch control 26, frequency selection switch 27 and telescopic antenna 24. A push-to-talk switch 23 is located on one side of housing 21. A grill 22 is provided behind which are located the speaker and microphone.

Figure 11:
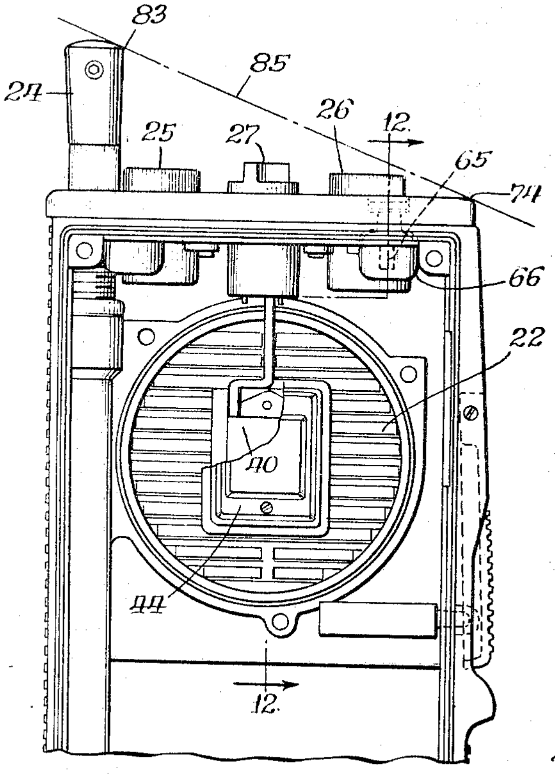
FIG. 11 is a view of one end of the circuit portion of the housing showing the location of various components.

As shown in FIG. 11 antenna 24 projects beyond the end housing 21 a predetermined length. The projection of the antenna is made sufficiently long so that a line 85 joining the top of the antenna 83 and housing corner 74 will clear the control knobs 25, 26 and 27. Thus if the unit is dropped or struck against a surface antenna 24 cooperates with housing corner 74 to prevent damage to the control knobs.

Figure 2:
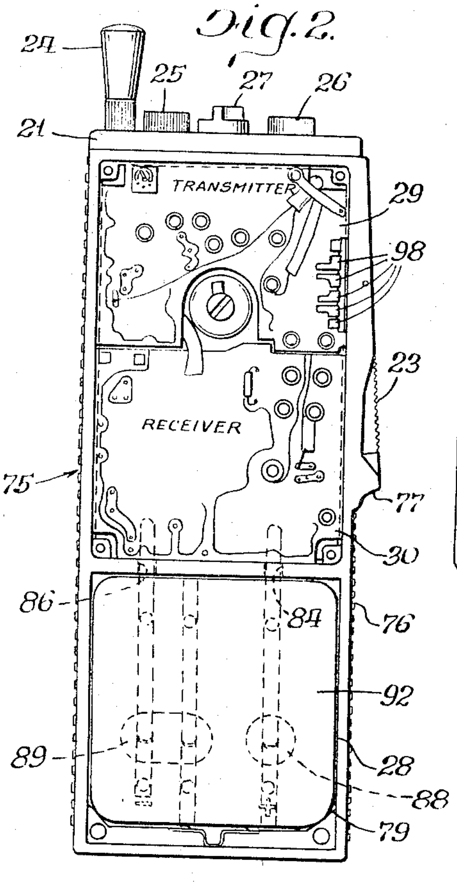
FIG. 2 is a view of the transmitter and receiver housing with the covers removed showing the location of the wiring boards and battery.

In FIG. 2 the back cover plates have been removed to show the location of the transmitter and receiver printed wiring boards together with the battery compartment. Only the transmitting portion of the circuit is contained on transmitter board 29, and only the receiver portion of the circuit is contained on receiver board 30. By using separate printed wiring boards for each portion of the transmitter and receiver, the transmitter is isolated from the receiver and will not interact with it. The unit is powered by a battery 92 located in battery compartment 28.

In FIG. 3 transmitter board 29, receiver board 30 and the battery are shown removed from the plastic housing 21. Battery compartment 28 has three terminals 32, 33 and 34 which connect the battery to the circuit portion and, when a rechargeable battery is used, to the charging terminals 90 and 93. Speaker 37 is located behind the printed wiring boards 29 and 30.

Figure 7:
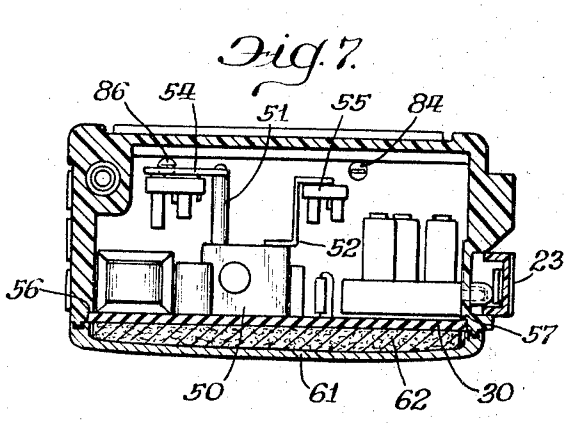
FIG. 7 is a cross sectional end view of the transmitter and receiver unit showing the location of various parts.

In FIG. 7, there is shown a cross-sectional view of the plastic housing and illustrating the internal arrangement of the printed wiring board components. In some models of the unit, additional printed wiring boards are necessary to incorporate added features. Because of the large number of components in a device of this nature and the limited amount of space available to mount these parts, it is difficult to find means by which the parts can be easily secured. A filter 50 having a metal case is mounted on receiver board 30. The metal case of filter 50 has mounting lugs 51 and 52 thereon. Attached to the mounting lugs are auxiliary printed wiring boards 54 and 55. By using a component to provide the mounting surface for the auxiliary wiring boards, it is possible to add certain features to the unit without excessive crowding of components already in place.

The large number of components necessarily placed on each printed wiring board in a transmitter and receiver of this size leaves little room on the board for holes for securing the boards to the plastic housing. In this unit, transmitter board 29 and receiver board 30 are supported on ledges in the sides of the plastic housing shown at 56 and 57 of FIG. 7 and 58 and 59 of FIG. 6. The edges of the printed wiring boards rest against these ledges. The wiring boards are held in place by the cover 61 of FIG. 7, which has fastened to it a layer of resilient material 62. The resilient material presses against printed wiring boards 29 and 30, holding them securely against the ledges 56, 57, 58 and 59 in the plastic housing.

As shown in FIG. 2 the sides of the plastic housing are serrated. These serrations, 75 and 76, provide friction between the hand of the user and the housing so that a firm grip is easily maintained. In addition a lip 77, protruding from the plastic housing, is positioned to bear against a finger of the user, enabling the user to grasp the unit lightly without danger of having it slip through his fingers. By not being required to grasp the unit tightly, the user can operate push-to-talk switch 23 more easily.

Figure 6:
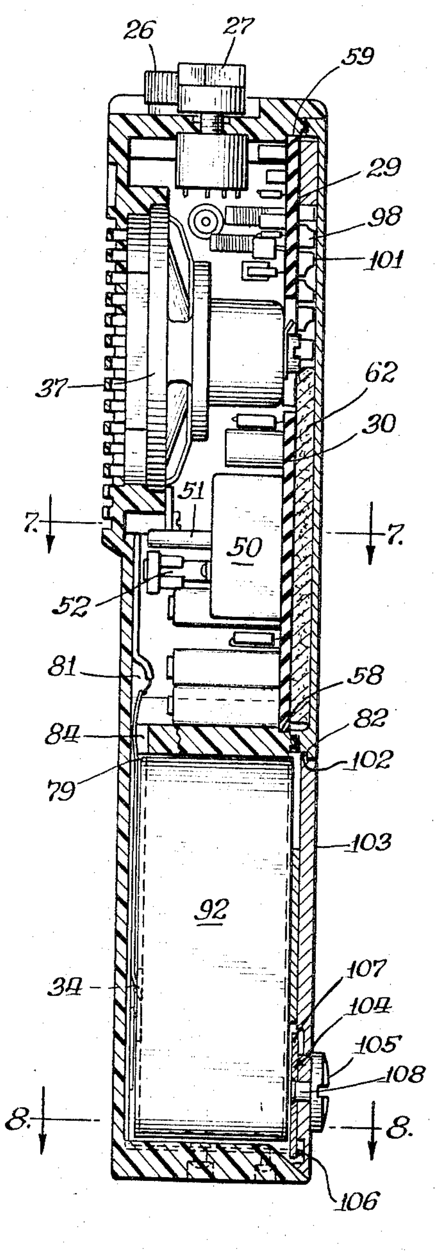
FIG. 6 is a cross sectional side view of the transmitter and receiver unit showing the location of various parts.
Figure 8:
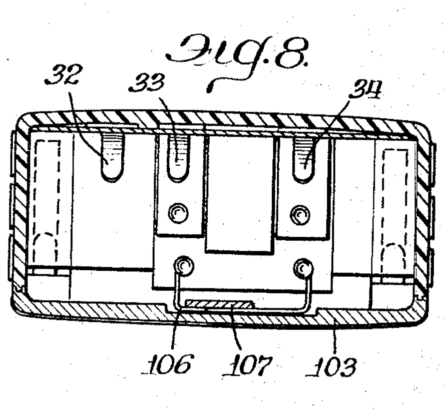
FIG. 8 is another cross sectional end view of the transmitter and receiver unit showing the location of various parts.
Figure 10:
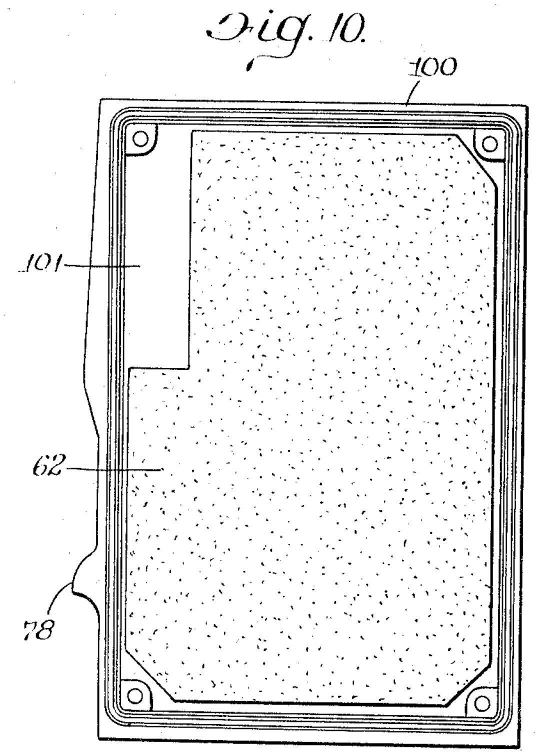
FIG. 10 is a view of the circuit compartment cover.

Referring to FIGS. 3, 6 and 8, connections are made from the battery to the unit by spring terminals 32, 33 and 34 located in battery compartment 28. The spring terminals are part of metal plates 35, 36 and 38. The metal plates act as conductors to connect the spring terminals to the circuitry in circuit compartment 81 and the charging terminals 90 and 93. Metal plates 35 and 38 continue through openings 86 and 84 from the battery compartment 28 to the circuit compartment 81. Openings 84 and 86 are larger than the metal plates passing through to provide means whereby air can enter and leave the circuit compartment 81. By providing openings 84 and 86 in this manner the circuit compartment 81 is vented without being exposed to moisture from outside the unit.

Figures 4, 5:
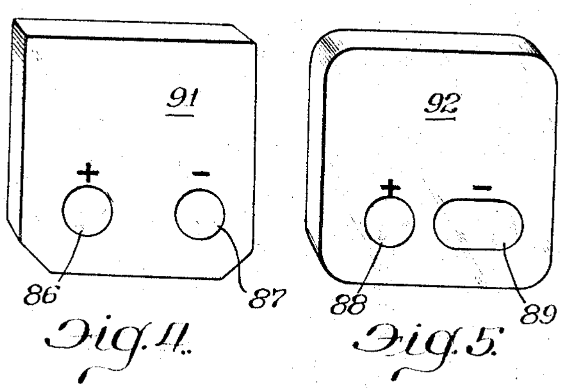
FIG. 4 illustrates a single use disposable battery used in the transmitter and receiver.
FIG. 5 illustrates a rechargeable battery used in the transmitter and receiver.

Two types of batteries can be used in this unit, rechargeable battery 92 shown in FIG. 5 and a single use, or nonrechargeable battery 91 shown in FIG. 4. The rechargeable battery shown in FIG. 5 has two terminals 88 and 89. When the battery is inserted into the battery compartment, battery terminal 89 makes contact with spring terminals 32 and 33 while battery terminal 88 makes contact with spring terminal 34. Spring terminals 33 and 34 are connected to charging terminals 90 and 93 through metal plates 36 and 38. Charging terminals 90 and 93 can be connected to an external charger to provide means for charging the rechargeable battery 92 without removing battery 92 from the battery compartment 28.

A single use disposable battery 91 is shown in FIG. 4 having battery terminals 86 and 87. Battery terminal 86 is similar to battery terminal 88 of the rechargeable battery 92 in FIG. 5 but battery terminal 87 is smaller than the corresponding battery terminal 89. When the single use disposable battery 91 is inserted into the battery compartment 28 battery terminals 86 and 87 contact spring terminals 34 and 32 only. Thus, the battery which is not rechargeable is not connected to charging terminal 90 and an accidental insertion of the transmitter receiver unit into a charger will not affect the single use disposable battery. If this were not done, it would be possible to seriously damage the unit by inadvertently trying to recharge a single use disposable battery. The terminals of the batteries are off center so that improperly inserting them into the battery compartment will not complete a connection between spring terminals 32, 33 and 34, and battery terminals 86 and 87 or 88 and 89. This prevents accidental connection of the batteries into the circuit with reversed polarity which could destroy portions of the transistor circuitry. The single use disposable battery 91 is shaped so that the corners are beveled. This battery will not fit into the battery compartment 28 with reversed polarity because of the beveling 79 of battery compartment 28. Rechargeable battery 92 could be shaped in this manner if desired.

Referring to FIGS. 2, 3, 6 and 10, heat generated by the power transistors, located on transistor wiring board 29, is conducted to fingers 98 which are attached to power transistors 99. These fingers conduct heat away from transistors 99. Fingers 98 are designed to press against the exposed portion 101 of cover 100 when the cover is in place. Thus, the metal fingers 98 conduct heat from the transistors 99 to the metal cover 100. The metal cover acts as a heat sink to dissipate the heat energy transferred thereto to prevent overheating of transistors 99.

The cover for the battery compartment is shown in

Figure 9:
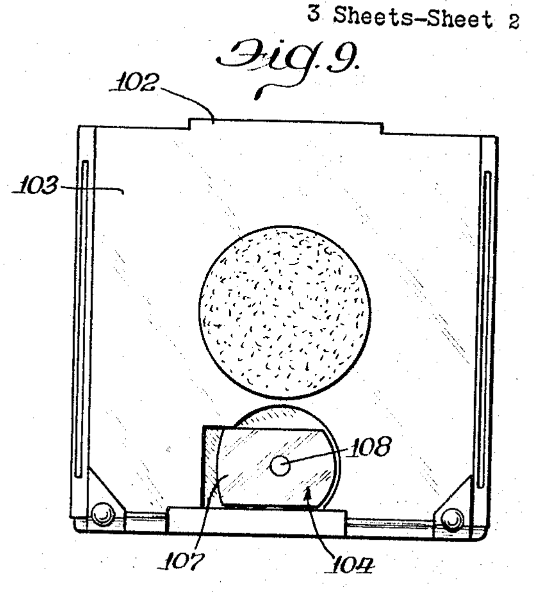
FIG. 9 is a view of the battery compartment cover.

FIGS. 6, 8 and 9. The cover 103 has a lip 102 at one end and a latch mechanism 104 at the other end. Lip 102 is inserted under slot 82 in the cover for the circuit compartment 100. The latch mechanism 104 has a slotted head 105 fastened to latch plate 107 by shaft 108. When cover 103 is in place on the housing latch plate 107 is rotated by inserting a screwdriver, coin or similar object in slotted head 105 and turning. Latch plate 107 engages latch catch 106 thereby securing the cover 103 to the housing.

Figure 12:
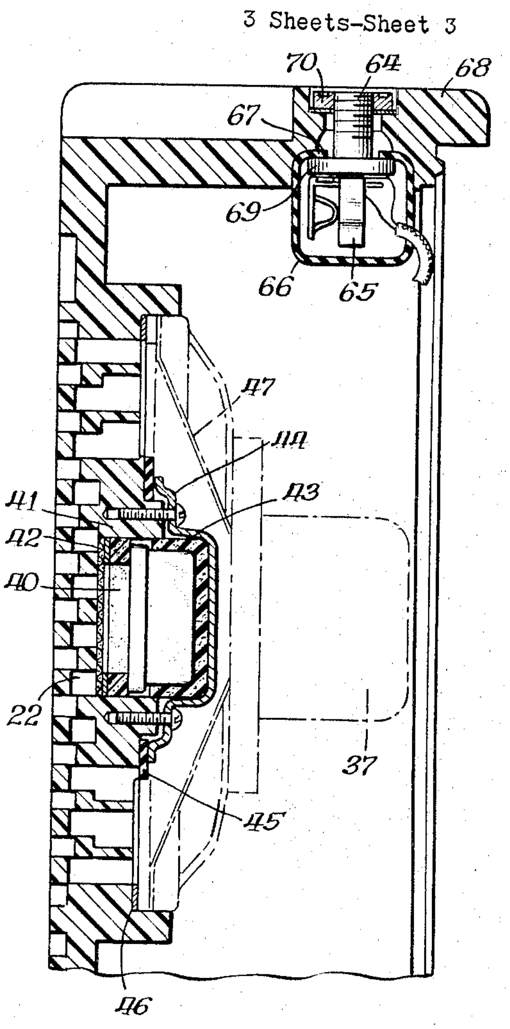
FIG. 12 is a cross sectional view of the housing showing the construction details of the jack mounting and the speaker microphone combination.

In FIG. 12 a cross sectional view of speaker 37 and microphone 40 is shown. Microphone 40 is located between the speaker cone 47 and grill 22. Sound reaches the microphone 40 and is received from speaker 37 through openings in grill 22. A gasket 45 is provided to seal the opening around speaker 37 to prevent moisture from entering the plastic compartment. An additional gasket 46 provides a seal against moisture entering around the speaker.

Also shown in FIGS. 11 and 12 is the construction of the jacks mounted on the same end wall of the unit as the control knobs. Jack 65 is mounted in the end wall 68 and is recessed so that no portion of jack 65 extends beyond end wall 68. In addition a rubber boot 66 surrounds the rearward portion of jack 65. This boot is forced against end wall 68 by shoulder 69 as nut 70 is tightened. This provides a waterproof seal for the jack mounting.

We claim:

1. A radio transmitter and receiver device of the type to be carried on the person and operated from a self-contained battery power source, the transmitter and receiver device including in combination, housing means including a circuit receiving portion and a battery receiving portion, said circuit receiving portion having metal cover means, a transmitter circuit board and a receiver circuit board each having components mounted thereon, said circuit boards being placed within said circuit receiving portion, said cover means being positioned against said circuit boards to secure said circuit boards within said circuit receiving portion, radio frequency power generating means positioned on said transmitter circuit board, and heat conduction means coupling said radio frequency power generating means to said metal cover means whereby said cover means receives heat from said generating means to act as a heat sink therefor.

2. A radio transmitter and receiver device of the type to be carried on the person and operated from a self-contained battery power source, the transmitter and receiver device including in combination, housing means including a circuit receiving portion and a battery receiving portion, said circuit receiving portion having metal cover means, a transmitter circuit board and a receiver circuit board each having components mounted thereon, said circuit boards being placed within said circuit receiving portion, said cover means being positioned against said circuit boards to secure said circuit boards within said circuit receiving portion, mounting means connected to one of said components, and an auxiliary circuit board connected to said mounting means.

3. A radio transmitter and receiver device of the type to be carried on the person and operated from a self-contained battery power source, the transmitter and receiver device including in combination, housing means having an end wall and first and second side walls joining said end wall at first and second corners, control knobs protruding from said end wall, a jack recessed within said end wall whereby said jack is protected from damage, telescopic antenna means mounted through said end wall adjacent said first corner, said antenna means having a predetermined minimum length and said knobs having a predetermined location in said end wall whereby said antenna means and said second corner cooperate to prevent damage to said knobs, and switch means mounted in one of said side walls, lip means formed in said one side wall adjacent said switch means, said first and second side walls being serrated, said lip means and said serrations cooperating to provide means for holding the device during operation.

4. A radio transmitter and receiver device of the type to be carried on the person and operated from a self-contained battery power source, the transmitter and receiver device including in combination, housing means having an end wall and first and second side walls joining said end wall at first and second corners, control knobs protruding from said end wall, telescopic antenna means mounted through said end wall adjacent one of said corners, and switch means mounted in one of said side walls, lip means formed in said one side wall adjacent said switch means, said first and second side walls being serrated, said lip means and said serrations cooperating to provide means for holding the device during operation.

5. A radio transmitter and receiver device of the type to be carried on the person and operated from a self-contained battery power source, the transmitter and receiver device including in combination, housing means having outside walls and including a circuit portion and a battery portion, said outside walls of said circuit portion having a first opening, a jack positioned in said opening, means for sealing said first opening including a rubber boot surrounding the rearward portion of said jack, said boot being compressed against said outside wall by said jack, an inside wall separating said circuit and said battery portions, second openings in said inside wall, conductive means passing through said second openings, said second openings being larger than said conductive means to provide vent openings for said circuit portion into said battery portion.

6. A radio transmitter and receiver device of the type to be carried on the person and operated from a self-contained battery power source, the transmitter and receiver device including in combination, housing means having outside walls and including a circuit portion and a battery portion, said outside walls of said circuit portion having a first opening therein, a jack positioned in said opening, an inside wall separating said circuit and said battery portions, second openings in said inside wall, conductive means passing through said second openings, said second openings being larger than said conductive means to provide vent openings for said circuit portion into said battery portion.

7. A radio transmitter and receiver device of the type to be carried on the person and operated from a self-contained battery power source, the transmitter and receiver device including in combination, housing means including a battery compartment having an end wall and an opposite inside wall, first, second and third conductive means having first, second and third power terminals respectively, first and second charging terminals located in said end wall, said first and third conductive means passing through said inside wall to energize the device, said first and second conductive means being connected to said first and second charging terminals respectively, said battery compartment being of a configuration to receive a rechargeable battery having a first battery terminal engaging said first power terminal and a second battery terminal engaging said second and third power terminals to provide energizing and charging paths therefor, said battery compartment also being of a configuration to receive a single use disposable battery having a first battery terminal engaging said first power terminal and a second battery terminal engaging said third power terminal whereby said single use disposable battery is connected to energize the device and is isolated from said charging terminals.

8. A radio transmitter and receiver device of the type to be carried on the person and operated from a self-contained battery power source, the transmitter and receiver device including in combination, housing means including a battery compartment having an end wall and an opposite inside wall, first, second and third conductive means having first, second and third power terminals respectively, first and second charging terminals located in said end wall, said first and third conductive means passing through said inside wall to energize the device, said first and second conductive means being connected to said first and second charging terminals respectively, said battery compartment being of a configuration to receive a rechargeable battery having a first battery terminal engaging said first power terminal and a second battery terminal engaging said second and third power terminals to provide energizing and charging paths therefor, said battery compartment also being of a configuration to receive a single use disposable battery having a first battery terminal engaging said first power terminal and a second battery terminal engaging said third power terminal whereby said single use disposable battery is connected to energize the device and is isolated from said charging terminals, and cover means for enclosing said battery compartment and for securing a battery therein, said cover means having a lip on one side thereof cooperating with said housing means and a latch on the other side thereof, with said lip and said latch forming the sole means for securing said cover means to said housing means.

9. A radio transmitter and receiver device of the type to be carried on the person and operated from a self contained battery power source, the transmitter and receiver device including in combination, housing means having first and second end walls and first and second side walls joining said end walls, said housing means including a circuit receiving portion adjacent said first end wall and a battery receiving portion adjacent said second end wall with an inside wall therebetween, control knobs protruding from said first end wall, jacks recessed within openings in said first end wall, means for sealing said openings including rubber boots surrounding the rearward portion of said jacks, said boots being compressed against said first end wall by said jacks, telescopic antenna means mounted through said first end wall adjacent said first side wall, said antenna means having a predetermined minimum length and said knobs having a predetermined location in said first end wall whereby said antenna means and the corner between said first end wall and said second side wall cooperate to prevent damage to said knobs, switch means mounted in one of said side walls, lip means formed in said one side wall adjacent said switch means, said first and second side walls being serrated, said lip means and said serrations cooperating to provide means for holding the device for operation, said side walls at said circuit receiving portion having ledges thereon, a transmitter circuit board and a receiver circuit board each having components mounted thereon, said circuit boards being placed within said circuit receiving portion and having edges resting on said ledges, metal cover means being positioned against said circuit boards to hold the same against said ledges whereby said cover means and said ledges cooperate to secure said circuit boards within said circuit receiving portion, mounting means connected to one of said components, and an auxiliary circuit board connected to said mounting means, radio frequency power generating means positioned on said transmitter circuit board, and heat conduction means coupling said radio frequency power generating means to said metal cover means whereby said cover means receives heat from said generating means to act as a heat sink therefor, first, second and third conductive means within said battery receiving portion having first, second and third power terminals respectively, first and second charging terminals located in said second wall, said inside wall having second openings therein, said first and third conductive means passing through said second openings to energize said transmitter and receiver circuit boards, said second openings being larger than said conductive means to provide vent openings for said circuit portion into said battery portion, said first and second conductive means being connected to said first and second charging terminals respectively, said battery compartment being of a configuration to receive a rechargeable battery having a first battery terminal engaging said first power terminal and a second battery terminal engaging said second and third power terminals to provide energizing and charging paths therefor, said battery compartment also being of a configuration to receive a non-rechargeable battery having a first battery terminal engaging said first power terminal and a second battery terminal engaging said third power terminal whereby said non-rechargeable battery is connected to energize said circuit boards and is isolated from said charging terminals, and cover means for enclosing said battery compartment and for securing a battery therein, said cover means having a lip on one side thereof and a latch on the other side thereof cooperating with said housing means and forming the sole means for securing said cover means to said housing means.

10. The structure of claim 1 wherein said heat conduction means includes resilient metallic finger means mechanically coupled to said radio frequency power generating means, said resilient finger means extending from said transmitter circuit board and contacting said metal cover means, whereby heat is conducted from said radio frequency power generating means to said metal cover means.

References Cited

UNITED STATES PATENTS

| | | | |
|---|---|---|---|
| 2,421,516 | 6/1947 | Mitchell | 325—16 X |
| 3,070,748 | 12/1962 | Worobey et al. | 325—361 X |
| 3,128,431 | 4/1964 | Walker | 325—111 |

JOHN W. CALDWELL, *Acting Primary Examiner.*